United States Patent

[11] 3,633,305

[72] Inventor Winston C. Grubb
 506 8th Ave., N.E., Grand Rapids, Minn. 55744
[21] Appl. No. 37,204
[22] Filed May 14, 1970
[45] Patented Jan. 11, 1972

[54] HARNESS FOR FISHING BOBBER
 5 Claims, 3 Drawing Figs.
[52] U.S. Cl. ..................................... 43/44.92, 43/43.1
[51] Int. Cl. ..................................... A01k 93/00
[50] Field of Search ........................... 43/44.92, 44.95, 43.1

[56] References Cited
UNITED STATES PATENTS
290,154  12/1883  Vidal, Jr. .................. 43/43.1
2,843,967  7/1958  Kruse ....................... 43/44.95

Primary Examiner—Samuel Koren
Assistant Examiner—Daniel J. Leach
Attorney—Orrin M. Haugen ABSTRACT: Fishing bobber means comprising, in combination, a spherical float means and a harness adapter for retaining the float means and for releasable attachment of the bobber means to a fishing line. The harness adapter comprises a generally circular closed ring, and a pair of semicircular segments disposed at right angles to the ring. One of the segments is fixedly secured to the ring and the other segment is adapted to be pivotally opened to permit the spherical float means to be inserted therewithin. The pivoted segment has locking mans for holding the segment in closed locked relationship to the ring and fixed segment. The float means is generally spherical in configuration, and at least a portion of its diameter exceeds the diameter of the ring and segments so as to provide for locking engagement of the float means within the harness adapter.

INVENTOR
WINSTON C. GRUBB

BY
ATTORNEY

HARNESS FOR FISHING BOBBER

BACKGROUND OF THE INVENTION

The present invention relates generally to an improved fishing bobber arrangement, and more particularly to a combined harness and float arrangement which, when assembled, comprises a fishing bobber of desirable characteristics. The structure is designed in order to enable an angler to change floats when desired, in order to achieve a different color, a different float characteristic, or in some instances, to replace a broken float. The structure is conveniently utilized by anglers for their various bobber needs.

In the past, fishing bobbers have been proposed wherein a float and harness arrangement were provided, with he float being interchangeable or removable from the harness. These devices have typically suffered from various drawbacks, such as, for example, a tendency for the harness and float to become disassembled, or from the swivel becoming fouled in the harness or float arrangement. The present invention overcomes these disadvantages by providing a float member which has at least a portion of its diameter in excess of the diameter of the harness. This provides for the degree of rigidity desired, and also prevents or reduces the tendency for the swivel to become snagged with the remaining portions of the arrangement. A still further advantage of the structure is that a relatively simple and straightforward locking arrangement can be designed and utilized for the harness member, since the bias force exerted by the float member against the harness will prevent accidental or unintentional disengagement of the harness from occurring.

In accordance with the present invention, a float and harness combination are provided for angling, wherein the harness is adapted to lock and generally enclose the float member, the float member having at least a portion of its diameter which is greater than the confining diameter of the harness so as to provide for rigid retention of the float within the harness member. The harness member employs a swivel lock which is disposed, preferably, within the confines of a slotted area so as to prevent the swivel lock from rotating around the float member or the harness. Preferably, the harness comprises a pair of locking or confining members, one being equatorially disposed about a confined float member, the other being in the form of two individual semicircular segments secured to the equatorially disposed ring, and held at right angles to the plane of the equatorial ring. It is generally preferred that the segments be disposed at right angles, one to another, to enhance the locking arrangement.

SUMMARY OF THE INVENTION

Therefore, it is an object of the present invention to provide an improved fishing bobber means which comprises, in combination, a spherical float means and a harness adapter for retaining the float means and for releasable attachment of the bobber means to a fishing line, the harness adapter comprising a first generally circular closed ring and a second segmented ring disposed at right angles to the first ring, at least one of the segments of the second ring being adapted to be pivotally opened for receiving the spherical float means therewithin.

It is a further object of the present invention to provide an improved rigid retainer means for confining a spherical fishing bobber float within a harness, the float having a diameter which, at least in part, exceeds the confining diameter of the harness ring, the arrangement providing for a secure and rigid combination.

It is yet a further object of the present invention to provide an improved fishing bobber means which comprises, in combination, a spherical float means and a harness adapter for retaining the float means, the harness adapter comprising wire segments which are arranged to be enclosed about the float, with the float having a portion of its diameter exceeding the diameter of the enclosing means.

Other and further objects of the present invention will become apparent to those skilled in the art upon a study of the following specification, appended claims, and accompanying drawing.

DESCRIPTION OF THE PREFERRED EMBODIMENT

Figure 1:
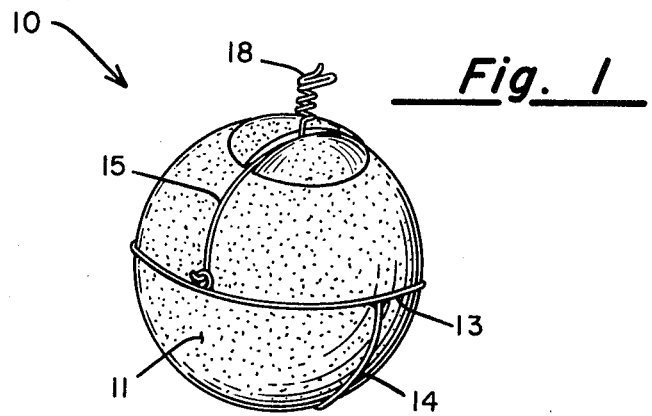
FIG. 1 is a perspective view of the combined float means and harness adapter forming the fishing bobber means of the present invention.
Figure 3:
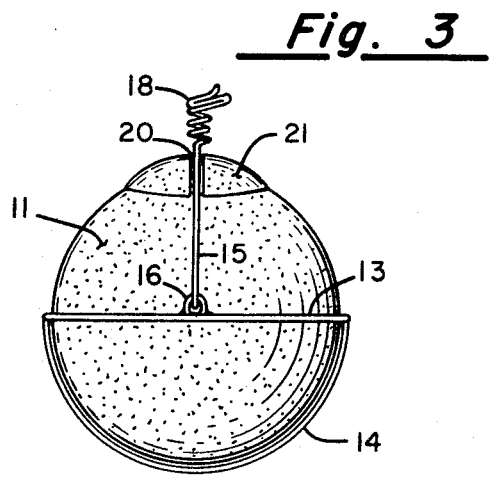
FIG. 3 is a view similar to FIG. 2, and taken along a diametrical plane disposed at right angles to the diametrical plane of FIG. 2.
Figure 2:
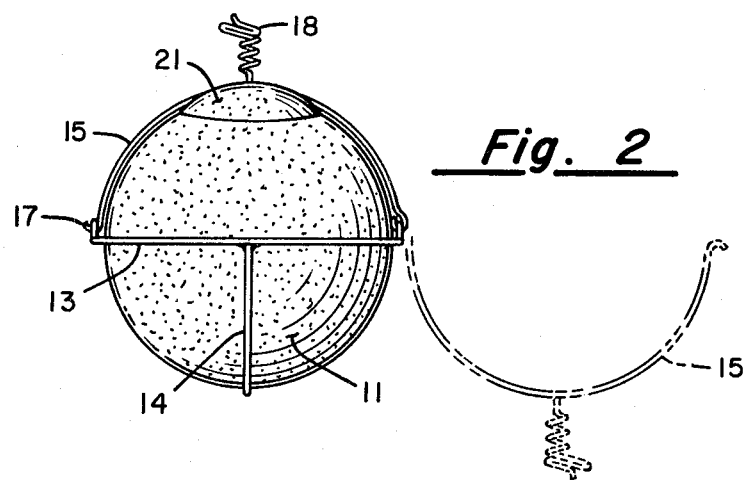
FIG. 2 is a detail sectional view of the fishing bobber means shown in FIG. 1, the view being taken substantially along a diametrical plane of the structure.

In accordance with the preferred modification of the present invention, and with particular attention being directed to FIG. 1 of the drawing, the fishing obbber structure generally designated 10 includes a generally spherical float means 11 confined within a harness adapter. The harness adapter comprises a number of sections, including the equatorially disposed closed ring 13, the base semicircular segment 14 which is secured at its end to the closed ring 13, and the semicircular locking segment 15. The semicircular locking segment 15 may be pivotally opened, as illustrated in phantom in FIG. 2, so as to permit the exchanging of one spherical float means for another. Suitable pivot and locking means are provided for the attachment of segment 15 to the closed ring 13, and may, for example, include a closed hook element 16 as shown in FIG. 3, along with a hook tip 17 at the opposite end thereof. Disposed midway between the ends of segment 15 is a swivel lock member 18 which is utilized to releasably attach the fishing bobber means to a fishing line. Swivel locks of the type shown at 18 are, of course, conventional and form no part of the instant invention.

The spherical float means 11 is preferably fabricated from a resilient substance such as, for example, foamed or frothed polyurethane, foamed or frothed vinyl, or foamed polystyrene. Obviously other foamed materials having a density of less than one may be employed for this component. Also, if desired, a hollow sphere may be employed, provided its configuration is appropriately considered. With attention being directed to FIG. 3 of the drawing, it will be observed that the float member 11 has a slot formed in its surface as at 20, this slot being utilized to maintain the harness swivel lock in predetermined position, and to prevent its rotating around the float means. In this arrangement, the diameter of the spherical float means, particularly in the area of the point 21, is greater than the diameter of the confining harness means. It has been found that various techniques may be employed to provide the retention means for the swivel lock, such as, for example, by forming the spherical float means of resilient material having a diameter which generally exceeds the diameter of the confining harness adapter. This will provide for firm locking retention of the float means within the harness adapter.

Turning now to the features of the harness, the structure is preferably prepared or fabricated from oxidation resistant material, such as, for example, stainless steel wire or the like. The confining ring 13 is, of course, closed in its configuration, and is utilized as a mounting point for the segments 14 and 15. Conventional soldering or brazing techniques may be employed to secure the segment 14 to the ring 13; however, other mounting schemes may be utilized, if desired. Normally, the size of the structure will determine the wire diameter to be employed, with the structure not requiring any unusual strength aside from the strength normally required for those bobber devices in normal angling use.

With attention being again directed to FIG. 3, it will be observed that the bobber ball is made with an offset or protruding zone covering a portion or segment of the entire spherical structure. This zone is formed with a confining slot which, as indicated previously, ensures stability of the entire or overall structure.

It will be appreciated, of course, that a variety of materials and techniques may be utilized for forming the harness means, for forming the spherical float member, and for providing the pivot and locking means for the segments of the harness adapter. It is, of course, normally preferred that when a foamed structure is utilized for the spherical float means, that a closed cell structure be utilized so as to prevent the spherical ball from becoming waterlogged after extensive periods of use. The apparatus of the present invention may permit the angler to change float members by color preference, density preference, or the like without being required to purchase and retain substantial quantities of individual float members, each of which must necessarily be disengaged from the fishing line means prior to change.

What is claimed is:

1. Fishing bobber means comprising, in combination, a spherical float means and a harness adapter for retaining said float means and for releasable attachment to a fishing line;
   a. said harness adapter comprising a generally circular closed ring and a pair of semicircular segments secured to said ring and disposed generally at right angles thereto one of said segments being adapted to be pivotally opened and with locking means for holding said pivotally opened segment in closed locked relationship to said ring, said ring being arranged to be held in and equatorial disposition about a retained and confined spherical float means with said segments being arranged to be held in generally polar disposition about said retained and confined spherical float means;
   b. said float means having a diameter with at least a portion thereof exceeding the effective diameter of said ring and segments.

2. The fishing bobber means as defined in claim 1 being particularly characterized in that said float means is substantially resilient.

3. The combination as defined in claim 1 being particularly characterized in that said spherical float means is fabricated from a foamed synthetic resin with closed cell configuration.

4. The combination as defined in claim 1 being particularly characterized in that slot means are formed in the surface of said spherical float means to accommodate a portion of said harness adapter therewithin.

5. The combination as defined in claim 1 being particularly characterized in that swivel means are attached generally midway along the extent of said pivotal harness adapter segment.

* * * * *